May 3, 1960    A. ZVEJNIEKS    2,934,830
METHOD AND AN APPARATUS FOR DRYING OF GYPSUM
Filed April 25, 1957
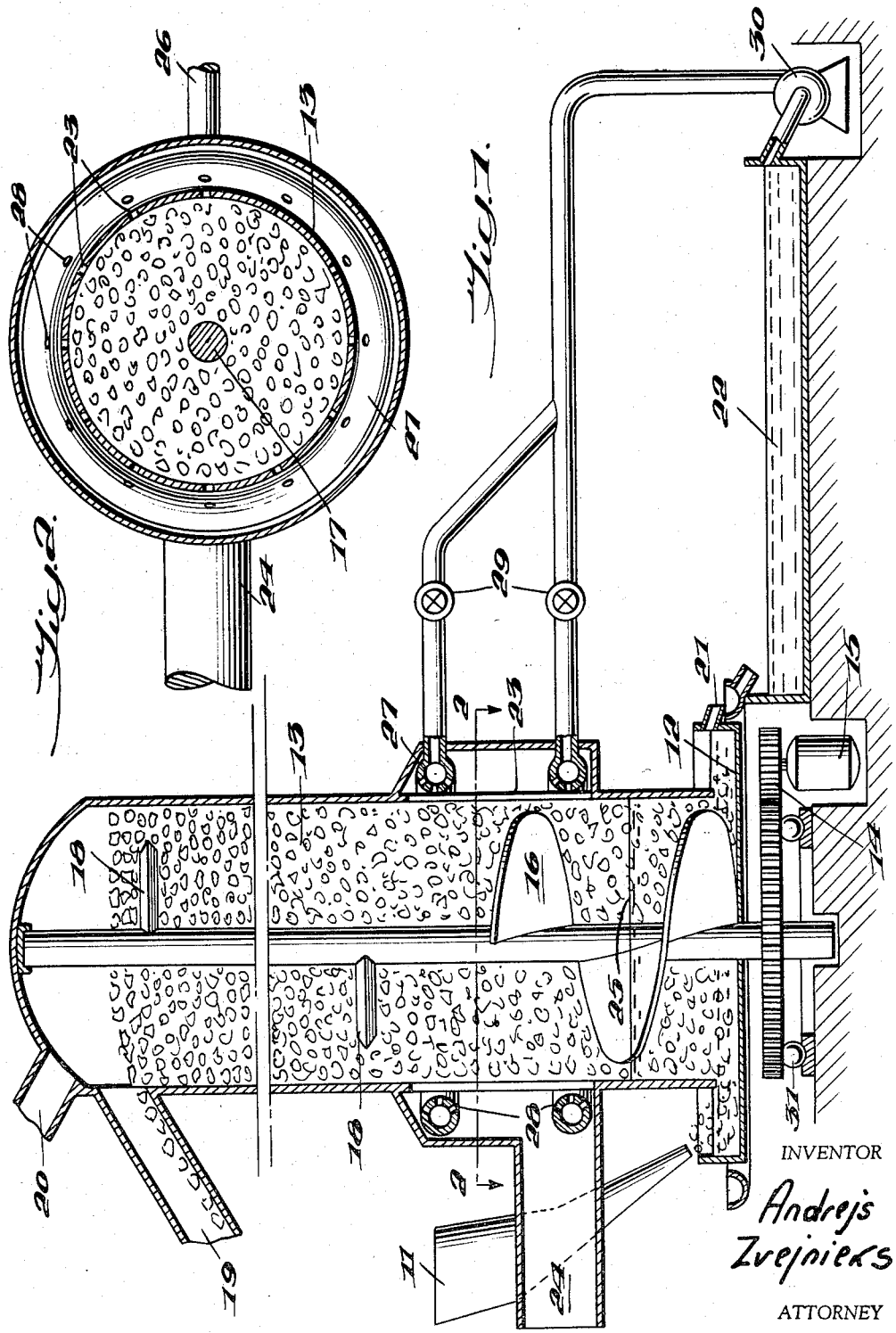
INVENTOR
*Andrejs Zvejnieks*
ATTORNEY United States Patent Office 2,934,830
Patented May 3, 1960

2,934,830

METHOD AND AN APPARATUS FOR DRYING OF GYPSUM

Andrejs Zvejnieks, Kankakee, Ill.

Application April 25, 1957, Serial No. 655,158

9 Claims. (Cl. 34—32)

The present invention relates to a method and an apparatus for drying of gypsum.

It is customary to dry gypsum prior to final grinding and calcining. This drying is usually done by contacting gypsum with hot combustion gases.

For calcining, grained gypsum is heated and one part of the crystallization water driven off as water vapor. This escaping water vapor contains some fine gypsum particles. To avoid the gypsum dust in surroundings the vapors from calcining apparatus are usually led through dust collectors prior to being discharged in atmosphere.

I have found that the hot water vapors, obtained by calcining of gypsum, can supply the heat necessary for drying of gypsum. Further I have found that by using the hot vapors, obtained by calcining of gypsum, for drying of gypsum, these water vapors are filtered and partly or fully condensed under their way through the bed of gypsum which is to be dried. By using this method the need for special dust collectors is also avoided.

The method according to the present invention comprises transporting gypsum upwards in a vertical shaft and directing hot gases from calcining of gypsum, containing gypsum dust and a substantial amount of water vapor, through said vertical shaft from the top towards the bottom in counter current direction to the movement of the gypsum, removing said hot gases which have been cooled by the upwards moving gypsum to a temperature at which a substantial part of the contained water vapor is condensed at the bottom of said shaft, removing the condensate from the bottom of said shaft and removing gypsum, which now is substantially dry from the top of said shaft. With this method a compact construction of drying and calcining apparatus and great heat economy are obtained. In the forthcoming an embodiment of the drying apparatus according to the invention will be described with reference to the attached drawings. Fig. 1 is a diagrammatic sectional side elevation of the drying apparatus. Fig. 2 is a sectional elevation through the apparatus taken on the line 1—1 of Fig. 1.

Crushed gypsum is fed from a hopper 11 into a slowly rotating bowl 12 coaxial with the drying shaft 13. The bowl is partly filled with water and serves as a liquid seal by means of which the shaft will be hermetically closed at this end. Bowl 12 is set into rotation on a roller bearing 31 by means of a gear 14, driven by a motor 15. The conveying upwards through shaft 13 is carried out by means of a perforated screw 16, fixedly joined with a bar 17, which is secured to the bowl 12. The bar is provided with arms 18 along its upper portion, so as to act as a stirrer. Through the tube 19 the dried gypsum is removed from the top of the shaft 13 and is led into a mill or hopper not shown.

The hot water vapors from calcining apparatus, not shown, or these water vapors mixed with hot combustion gases are led in through connection 20 and then downwards through shaft 13. Said hot vapors and gases are heating and drying the gypsum in shaft 13. The condensed water flows downwards as liquid water in the shaft 13, is collected in the bowl 12 and is led out through an overflow 21 to a settling basin 22 where the suspended fine gypsum particles are settled out. The produced water can be discharged or reused in production. The gases that have not been condensed on the cold gypsum in the lower section of the shaft are withdrawn by means of a device, not shown, through grates 23 and conduit 24. In the shaft a pressure should be maintained, negative to such an extent that the surface of the water is maintained at the level indicated at 25. To keep the grates 23 clean and to cool the gases, water is pumped by means of a pump 30 through the pipe 26 into two circular coils 27, surrounding the shaft 13 one at the upper the other one at the lower end of the grates 23. Through small holes 28 in these coils jets of washing water are directed against the grates. The flow of that cleaning water can be directed to only one coil or alternated periodically with valves 29. These valves can also be operated automatically.

I would state that while the foregoing description discloses one embodiment of my invention, it is not to be taken as a limiting one, since many variations of the process may be made by those skilled in the art without departing from the spirit of the invention.

What I claim is:

1. A method of drying gypsum, which comprises the following continuously practiced sequence of steps: introducing moist gypsum in coarsely crushed form through a pool of liquid into the lower end of a substantially vertical shaft; introducing hot gas containing gypsum dust and a substantial amount of water vapor into the upper portion of said shaft; positively moving said hot gas as a current through said shaft; transporting said coarsely crushed gypsum as a column, uniformly occupying essentially all the free space in said shaft, relatively slowly and with positive agitation upwards through said shaft in direct countercurrent contact with said hot gas thereby vaporizing substantially all the moisture in said gypsum in the upper portion of the shaft and preheating said gypsum in the lower portion of the shaft by condensing a substantial part of the water vapor, contained in said hot gas and formed in the upper portion of the shaft by action of said hot gas on said moist gypsum; removing the condensate and not condensed gases from the lower portion of said shaft; and removing gypsum substantially dry from the upper portion of said shaft.

2. A method as claimed in claim 1, in which the hot gases are water vapors, obtained by calcining of gypsum.

3. A method as claimed in claim 1 in which the hot gases are water vapors, obtained by calcining of gypsum, and hot combustion gases.

4. A method as claimed in claim 1, in which the not condensed gases are withdrawn from the bottom of the shaft by means of suction.

5. A method as claimed in claim 1 in which the cooled gases are withdrawn through grates placed in the vertical wall of the shaft, said grates being rinsed with water during the drying operation.

6. An apparatus for drying gypsum in direct contact with hot gas, comprising a substantially vertical shaft; means for feeding coarsely crushed gypsum through a pool of a liquid into the bottom portion of said shaft; means for transporting said coarsely crushed gypsum upwards through said shaft as a continuous column, uniformly occupying essentially all the free space in said shaft; means for transporting said hot gas downwards through the shaft and through said column of coarsely crushed gypsum in said shaft, in counter current contact with the ascending coarsely crushed gypsum; means for removing gypsum from the upper portion of said shaft; grates for removing water and gaseous products from said shaft, said grates being placed in the lower portion of the shaft's wall; and a bowl coaxial with said shaft, said bowl enclosing the bottom end of said shaft in such a manner that a liquid trap is formed when water or condensate are collected in said bowl.

7. An apparatus as claimed in claim 6, comprising means for directing jets of water against the grates.

8. An apparatus as claimed in claim 7 in which the means for directing jets of water against the grates comprises sections of pipe, said pipe being provided with a number of small holes directed against the grates and with means for maintaining water pressure in said sections of pipe.

9. An apparatus as claimed in claim 8 comprising means for altering the water pressure in said sections of pipe.

References Cited in the file of this patent

UNITED STATES PATENTS

| | | |
|---|---|---|
| 892,502 | Coon | July 7, 1908 |
| 2,004,381 | Middelboe | June 11, 1935 |
| 2,277,361 | Bonotto | Mar. 24, 1942 |
| 2,688,807 | Ginther | Sept. 14, 1954 |
| 2,715,282 | Niven | Aug. 16, 1955 |